United States Patent
Fervel et al.

(10) Patent No.: US 8,600,584 B2
(45) Date of Patent: Dec. 3, 2013

(54) AIRCRAFT CONTROL SYSTEM WITH INTEGRATED MODULAR ARCHITECTURE

(75) Inventors: Marc Fervel, Toulouse (FR); Arnaud Lecanu, Blagnac (FR); Antoine Maussion, Toulouse (FR); Jean-Jacques Aubert, Pibrac (FR)

(73) Assignee: Airbus Operations S.A.S., Toulouse (FR)

( * ) Notice: Subject to any disclaimer, the term of this patent is extended or adjusted under 35 U.S.C. 154(b) by 0 days.

(21) Appl. No.: 13/255,406

(22) PCT Filed: Mar. 10, 2010

(86) PCT No.: PCT/FR2010/050406
§ 371 (c)(1),
(2), (4) Date: Jan. 5, 2012

(87) PCT Pub. No.: WO2010/103234
PCT Pub. Date: Sep. 16, 2010

(65) Prior Publication Data
US 2012/0109424 A1    May 3, 2012

(30) Foreign Application Priority Data

Mar. 11, 2009  (FR) ...................................... 09 51528

(51) Int. Cl.
*G05D 1/00* (2006.01)
(52) U.S. Cl.
USPC ............................................................ 701/3
(58) Field of Classification Search
USPC ............................................................ 701/3
See application file for complete search history.

(56) References Cited

U.S. PATENT DOCUMENTS

| | | | | |
|---|---|---|---|---|
| 5,339,782 | A * | 8/1994 | Golzer et al. | 123/399 |
| 5,351,914 | A | 10/1994 | Nagao et al. | |
| 5,613,652 | A * | 3/1997 | Greene | 244/76 R |
| 5,868,359 | A * | 2/1999 | Cartmell et al. | 244/223 |
| 6,171,055 | B1 * | 1/2001 | Vos et al. | 416/1 |
| 6,366,837 | B1 | 4/2002 | Yount et al. | |
| 6,480,780 | B1 * | 11/2002 | Schwamm | 701/100 |
| 7,011,498 | B2 * | 3/2006 | Vos et al. | 416/28 |
| 7,242,683 | B2 | 7/2007 | Saint Etienne et al. | |
| 7,826,937 | B2 * | 11/2010 | Roux et al. | 701/3 |

(Continued)

FOREIGN PATENT DOCUMENTS

| | | |
|---|---|---|
| EP | 0 518 345 | 12/1992 |
| EP | 1 353 247 | 10/2003 |

(Continued)

OTHER PUBLICATIONS

U.S. Appl. No. 13/255,778, filed Sep. 9, 2011, Fervel, et al.

(Continued)

*Primary Examiner* — Thomas Tarcza
*Assistant Examiner* — Alex C Dunn
(74) *Attorney, Agent, or Firm* — Oblon, Spivak, McClelland, Maier, & Neustadt, L.L.P.

(57) ABSTRACT

An aircraft control system in which a plurality of elementary control systems, corresponding to different aircraft functions, can share one or more sensors due to a common AFDX network. The transmission of commands is carried out via AFDX messages sent to network-subscribed actuators. Advantageously, the computers of the different elementary control systems installed in the avionics bay include generic computers hosting software specific to execution of respective functions thereof (IMA architecture).

18 Claims, 11 Drawing Sheets

(56) References Cited

U.S. PATENT DOCUMENTS

| | | | |
|---|---|---|---|
| 8,275,494 B1* | 9/2012 | Roth | 701/3 |
| 2003/0195673 A1 | 10/2003 | Foch et al. | |
| 2005/0065669 A1* | 3/2005 | Roux et al. | 701/3 |
| 2005/0178903 A1* | 8/2005 | Boorman et al. | 244/118.5 |
| 2006/0116803 A1* | 6/2006 | Armbruster et al. | 701/48 |
| 2006/0293805 A1 | 12/2006 | Garcia | |
| 2007/0077540 A1* | 4/2007 | Testrake et al. | 434/37 |
| 2007/0145180 A1 | 6/2007 | Johnson et al. | |
| 2007/0271010 A1 | 11/2007 | Kossentini | |
| 2008/0154441 A1* | 6/2008 | Harrison et al. | 701/3 |
| 2010/0076627 A1* | 3/2010 | Boorman et al. | 701/5 |
| 2010/0170983 A1 | 7/2010 | Fervel et al. | |
| 2010/0170999 A1 | 7/2010 | Fervel et al. | |
| 2011/0118906 A1 | 5/2011 | Fervel et al. | |
| 2011/0174921 A1 | 7/2011 | Fervel et al. | |
| 2011/0251739 A1* | 10/2011 | Tomas et al. | 701/3 |
| 2011/0276199 A1* | 11/2011 | Brot | 701/3 |

FOREIGN PATENT DOCUMENTS

| | | |
|---|---|---|
| FR | 2 832 011 | 5/2003 |
| FR | 2 901 379 | 11/2007 |
| FR | 2 920 623 | 3/2009 |
| WO | WO 02/06910 | 1/2002 |

OTHER PUBLICATIONS

International Search Report issued Dec. 7, 2010 in Patent Application No. PCT/FR2010/050406.

GE Intelligent Platforms, "AFDX/ARINC 664 Protocol—Tutorial (GFT-640A)", Jan. 2010, 24 Pages.

* cited by examiner

AIRCRAFT CONTROL SYSTEM WITH INTEGRATED MODULAR ARCHITECTURE

TECHNICAL FIELD

The present invention generally relates to aircraft control systems.

BACKGROUND OF THE INVENTION

The control of an aircraft generally calls on many control systems, including in particular:
- the primary flight control system, which makes it possible to control the aircraft's movement around its roll, yaw and pitch axes, by acting on the ailerons, rudders, elevators and the trimmable horizontal stabilizer (THS). It also controls the aircraft's drag by acting on the spoilers;
- the secondary flight control system, making it possible to control the camber of the wings and therefore the lift, during takeoff and landing phases, by acting on the flaps and the slats, also called leading edge slats;
- the propulsion control system, making it possible to control and reverse the thrust from the engines;
- the brake control system of the landing gear;
- the steering control system;
- the control system for the hydraulic circuits.

In general the primary flight system is simply called the flight control system. We will adopt this convention below in order to simplify the description.

The flight control system connects the steering members (control column, rudder bar, etc.) and the aerodynamic tip-control surfaces (ailerons, vertical stabilizers, elevators, etc.). Modern jetliners have electric-type flight control systems in which the mechanical actions on the piloting members are converted into analog signals that are sent to actuators maneuvering the control surfaces.

Figure 1:
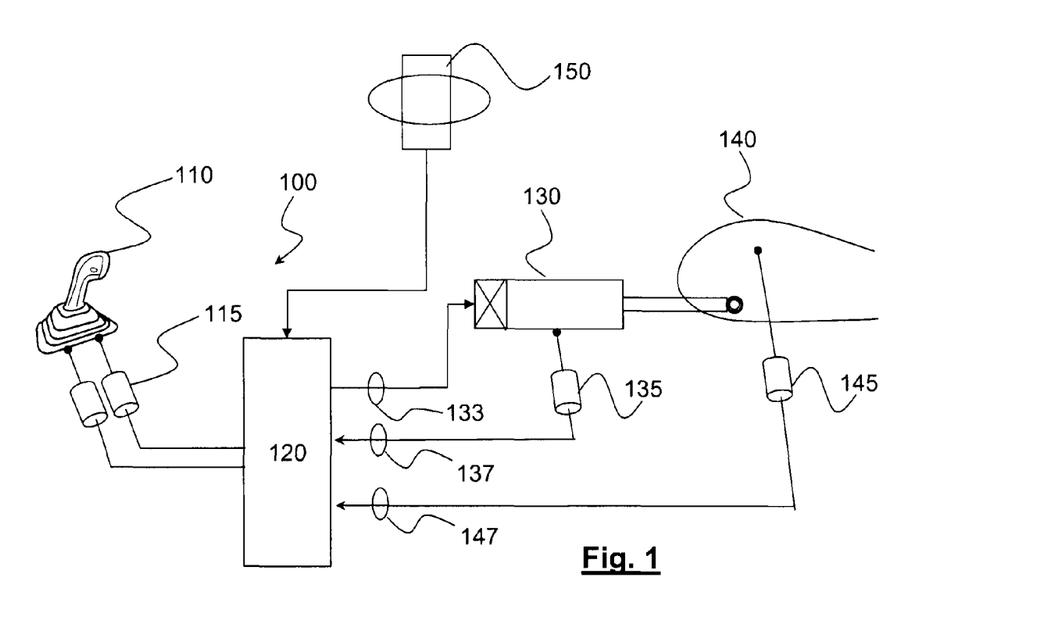
FIG. 1 diagrammatically illustrates a flight control system known from the state of the art.

FIG. 1 diagrammatically illustrates the architecture of a flight control system 100, known from the state of the art. We have shown a piloting member 110, for example a side-stick, equipped with one or more sensors 115, for example position sensors and/or angular sensors providing position and/or orientation information to the flight control computer 120. The computer 120 determines, from information received from the various piloting members 110, here including the autopilot (not shown) and/or, if applicable, airplane sensors 150 (accelerometer, rate gyro, inertial unit), the flight controls to be applied to the actuators 130. These actuators are typically hydraulic cylinders controlled by servo-valves or electric motors acting on the aerodynamic flight-control surfaces of the aircraft 140. The actuators 130 on the one hand, and the aerodynamic flight-control surfaces 140 on the other hand, are equipped with sensors respectively denoted 135 and 145. These sensors inform the computer 120 on the positions and/or orientations of the mobile elements of the actuators as well as those of the control surfaces. For example, one sensor 135 could indicate the translational position of a cylinder, one sensor 145 the orientation of a flap.

The computer 120 has both a command function and a monitoring function. It is connected to the actuators by first cables 133 intended to transmit the analog control signals. It is also connected to the sensors 135 and 145 respectively equipping the actuators and the control surfaces themselves by second cables 137 and third cables 147. It can thus, at any time, monitor the status of the actuators and verify that the commands have been carried out correctly.

In reality, a flight control system is generally made up of several independent computers, each computer having its own set of sensors and actuators and its own cable network.

Figure 2:
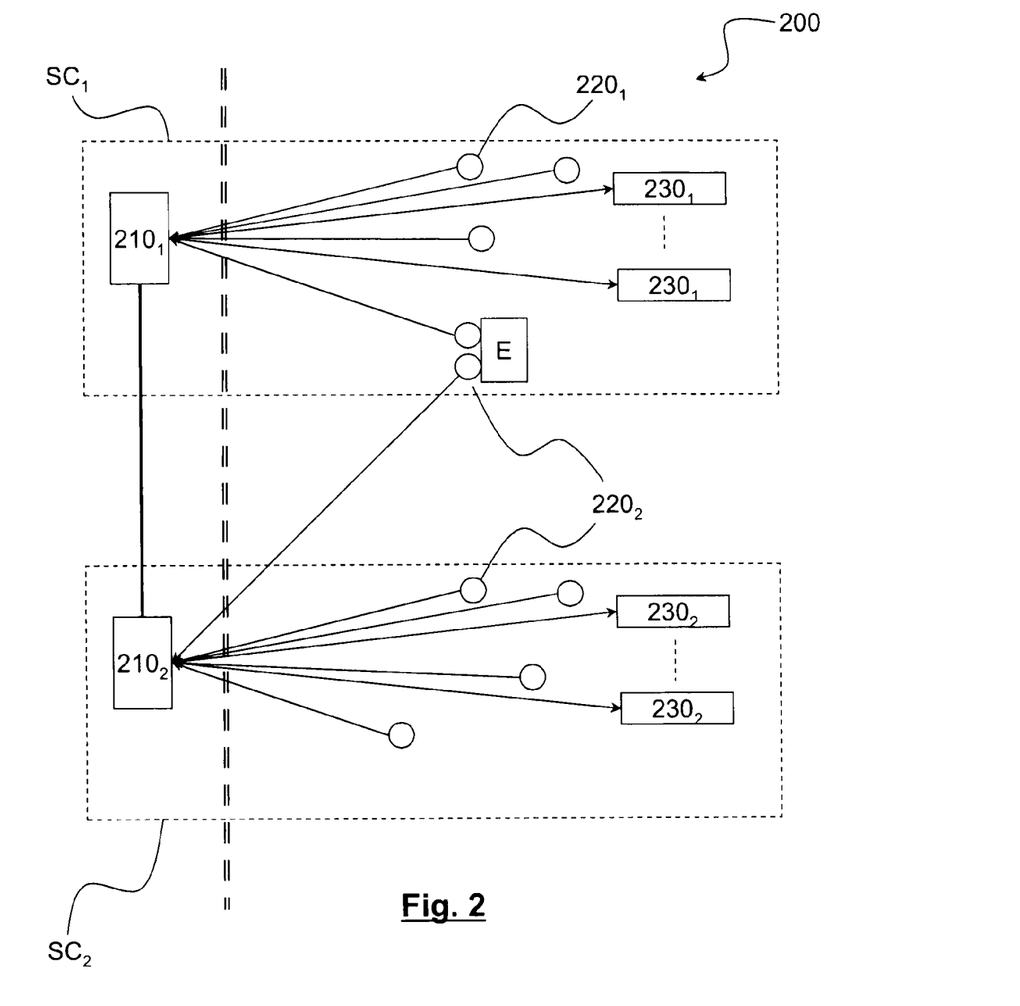
FIG. 2 diagrammatically illustrates the architecture of an aircraft control system known from the state of the art.

FIG. 2 diagrammatically illustrates the architecture of an aircraft control system 200. It comprises the flight control system as well as a plurality of other control systems, examples of which were provided in the introduction. For simplification purposes, only two control systems $SC_1$ and $SC_2$ have been shown here.

Each control system SCn, n=1,2 comprises at least one dedicated computer 210 $n$ processing the signals received from one or more sensor(s) 220$n$, and transmitting commands to one or more actuator(s) 230 $n$ via a plurality of cables.

The different control systems are placed in the avionics bay (delimited in the diagram by a broken double line) and connected to each other using an avionics network, for example an AFDX (Avionics Full DupleX switched Ethernet) network. It will be recalled that the AFDX network, specifically developed for aeronautics needs, is based on a switched Ethernet network. A detailed description of the characteristics of this network can be found in a document entitled "AFDX protocol tutorial" and in patent application FR 2001-0014263 (published as FR-A-2832011 on May 9, 2003) filed Nov 5, 2001 in the Applicants name.

When the computer of the control system $SC_2$ needs a measurement on a piece of equipment E, done by a sensor belonging to the control system $SC_1$, the computer $210_1$ in charge of $SC_1$ transmits that measurement to computer $210_2$ through the avionics network. However, it is sometimes necessary, to satisfy availability constraints (e.g. breakdown of computer $210_1$) or latency constraints (transfer time via computer $210_1$) to duplicate the sensor on the equipment E. In other words, a second sensor $220_2$ is then provided on the equipment E, directly connected to the computer $SC_2$.

This aircraft control system architecture has a certain number of drawbacks, including the multiplication of the number of sensors and related cables, which strains the aircraft's weight budget. Furthermore, the analog signals transmitted by the sensors can be affected by noise due to electromagnetic disturbances.

The object of the present invention is therefore to propose an aircraft control system resolving the aforementioned drawbacks, i.e. a system making it possible to reduce the cabling between the avionics bay and the sensors/actuators, as well as to reduce the number of sensors on the equipment, without sacrificing the required level of safety.

BRIEF DESCRIPTION OF THE INVENTION

The present invention is defined by an aircraft control system comprising a first control system, intended to control a first function of the aircraft, a second control system, separate from the first control system, intended to control a second function of the aircraft, separate from the first function, the first control system comprising at least one first computer, a first set of sensors and actuators, the first computer being adapted to receive measurements from said sensors and to control said actuators of said first set, the second control system comprising at least one second computation module, a second set of sensors ($320_2$) and actuators, the second computer being adapted to receive measurements from said sensors and to control said actuators of said second set. The first and second computers as well as the sensors and actuators of the first and second sets subscribe to a same AFDX network and the first and second sets have at least one shared sensor.

Advantageously, said first and second computers each comprise a control channel and a monitoring channel, each channel being made up of software specific to the function performed by the computer, housed by a generic computer, the specific software of the first channel being different from the specific software of the second channel.

Said first control system is preferably a primary flight control system adapted to control the ailerons, elevators, vertical stabilizers and spoilers of the aircraft.

According to a first embodiment, said second control system is a secondary flight control system adapted to controlling the slats as well as the flaps of the aircraft.

The secondary flight control system advantageously comprises a plurality of sensors to measure the respective output amplitudes of the flaps, the measurements provided by these sensors being sent to the AFDX network using electronic control modules of the primary flight control system, said electronic control modules being arranged nearby and controlling the actuators of the aircraft's spoilers.

According to a second embodiment, said second control system is a propulsion control system, adapted to control the respective speeds of the aircraft's engines.

The second computer is advantageously adapted to receive, in manual mode, a thrust reference from a manual thrust control member or, in automatic mode, from the first computer and to deduce therefrom an engine speed reference before sending it to a control unit of an engine of the aircraft.

According to a third embodiment, said second control system is a braking control system of the aircraft.

The braking system advantageously comprises a plurality of speed sensors and torque sensors mounted on the aircraft's landing gear, the measurements provided by these sensors being acquired and formatted in the form of AFDX messages by data concentrators before being transmitted to the second computer via said network.

Preferably, the speed measurements are also sent to the first computer by the data concentrators, via the AFDX network, said computer determining an output order for said spoilers as a function of said provided speed and braking information, in manual mode by the brake pedals, and in automatic mode by an automatic braking unit.

According to a fourth embodiment, said second control system is a steering system for at least the front wheel of the aircraft.

In that case, the first and second computers advantageously receive deflection information provided by the rudder bar and/or control rods of the piloting station and, in manual mode, the second computer determines the deflection angle of the wheel and sends it, via said network, to a steering control unit, situated near it and, in automatic piloting mode, the first computer determines a command of the rudder, sends it, via said network, to the second computer, the second computer deducing the deflection angle therefrom and transmitting it to said steering control unit.

According to a fifth embodiment, said second control system is a hydraulic control system of the aircraft, adapted to start and stop at least one electric pump mounted on a hydraulic circuit.

Said hydraulic control system then advantageously comprises at least one contactor subscribing to said network and adapted to start/stop said pump, a pressure sensor mounted on the hydraulic circuit, the pressure measurements provided by said sensor being acquired and formatted in the form of AFDX messages by a data concentrator, then sent to the first and second computers via said network.

The invention lastly concerns an aircraft, comprising an aircraft control system as defined above.

BRIEF DESCRIPTION OF THE DRAWINGS

Other features and advantages of the invention will appear upon reading preferred embodiments of the invention described in reference to the appended figures, in which.

DETAILED DESCRIPTION OF THE INVENTION

We will again consider an aircraft control system comprising a plurality of elementary control systems, each elementary control system being responsible for a particular function of the aircraft. For example, these elementary control systems may be those already mentioned in the introduction.

The idea at the basis of the invention is to extend the AFDX network, traditionally connecting the computers of the avionics bay to the entire flight control system, the computer(s), sensors and actuators of said system then subscribing to said network. In this way, any two elementary control systems, connected to the same AFDX network, can share one or more sensors.

Figure 3:
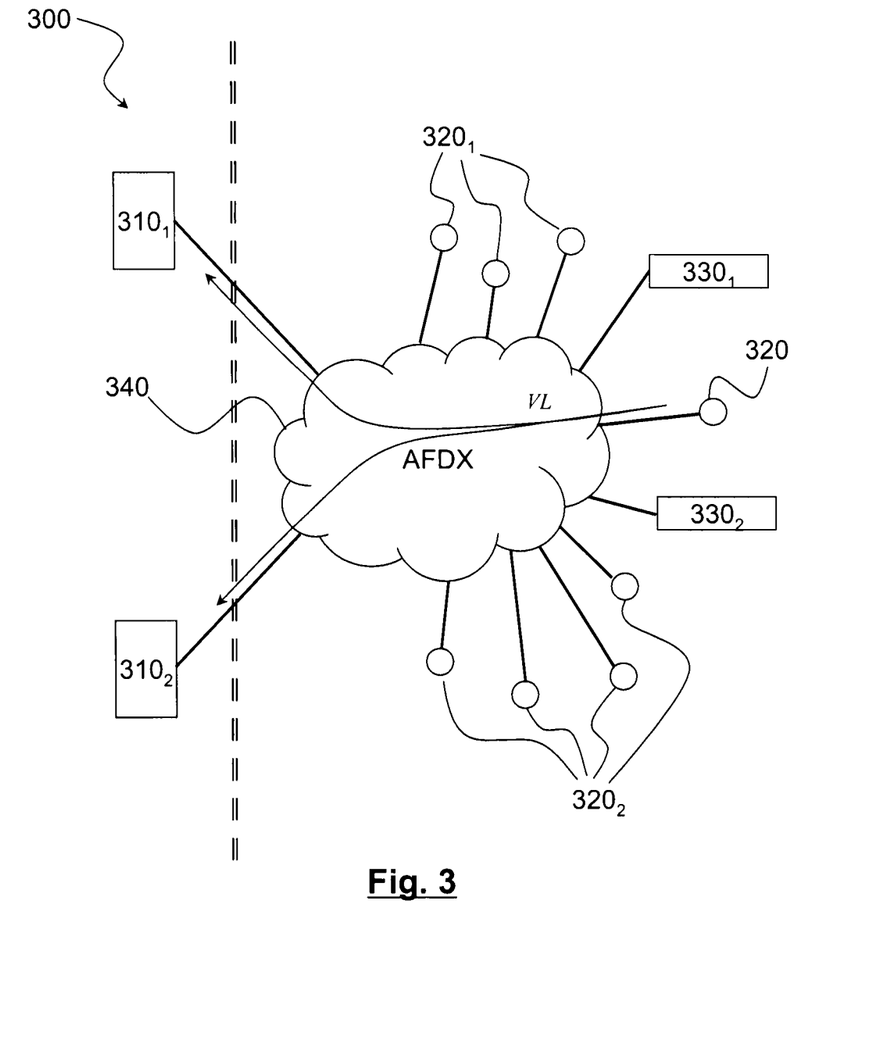
FIG. 3 diagrammatically illustrates the architecture of an aircraft control system according to one embodiment of the invention.

FIG. 3 diagrammatically shows the architecture of an aircraft control system according to one embodiment of the invention. For simplification and non-limitingly, only two elementary control systems $SC_1$ and $SC_2$ have been shown. Elementary control system $SC_1$ comprises at least one computer $310_1$ as well as a plurality of sensors $320_1$ and actuators $330_1$ (only one of which is shown) all subscribing to the AFDX network 340. Likewise, elementary control system $SC_2$ comprises at least one computer $310_2$ as well as a plurality of sensors $320_2$ and actuators $330_2$ (only one of which is shown) also subscribing to said same network. At least one sensor, designated by 320, is shared by the two elementary control systems $SC_1$ and $SC_2$. The sensor 320 transmits its measurements to the computers $310_1$ and $310_2$ via the AFDX network, either using several unicast-type virtual links or using at least one multi-cast-type virtual link VL (the second alternative is shown in FIG. 3).

One will thus understand that the multiplication of sensors and therefore deployment of many cables for connections with the computers of the avionics bay is avoided.

Advantageously, the flight control system plays a central role in pooling the sensors 320, in other words each elementary control system can share one or more sensor(s) with the latter. This central role is explained by the fact that the flight control system extends through the entire aircraft, and has many connection points and many sensors distributed throughout the aircraft.

Figure 4:
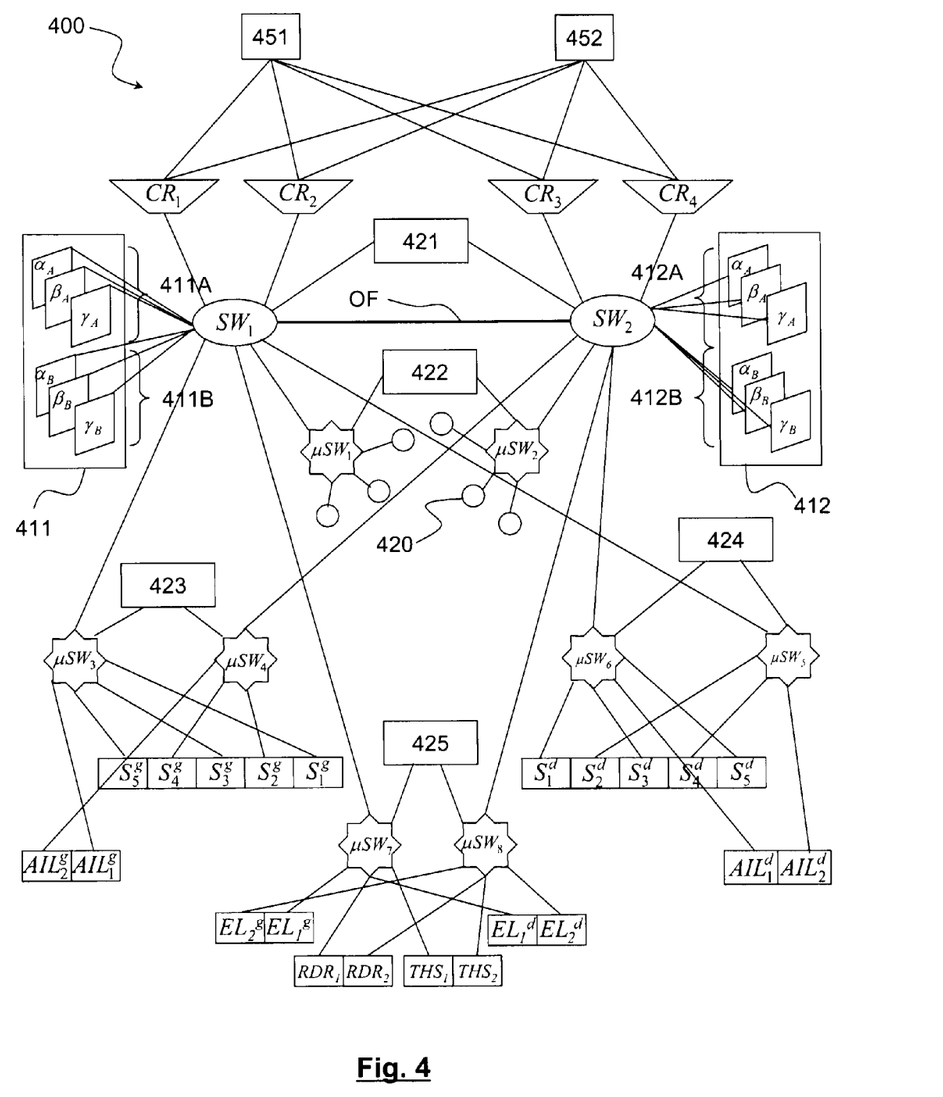
FIG. 4 diagrammatically shows the architecture of a primary flight control system that can advantageously be used in the system of FIG. 3.

FIG. 4 shows one example of a flight control system architecture that can be used in the aircraft control system according to the invention.

The AFDX network comprises a plurality of frame switches arranged in communication nodes of the aircraft. In the illustrated case, two frame switches $SW_1, SW_2$ are installed in the avionics bay and are respectively responsible for the left part and the right part of the apparatus. Advantageously, these switches are connected to each other using a fiber optic connection OF making it possible to electrically uncouple the two parts of the network.

In order to reduce the number and length of the links, it is advantageously possible to provide frame switching equipment called micro-switches. The micro-switches make it possible to locally process the frames coming from or intended for a cluster of terminals subscribing to the network. More precisely, a micro-switch has a first port generally connected to an AFDX switch and a plurality of second ports connected to the different subscribers. On the downlink, i.e. for frames received by the first port intended for a subscriber, the micro-switch acts as a hub, i.e. an incident frame on the first port is replicated on all of the second ports. The subscribing terminals that receive it determine whether they are recipients, and ignore it if not and take it into consideration if yes. However, on the uplink, i.e. for frames emitted by the different subscribing terminals, the micro-switch examines the second ports one by one and empties their respective buffers on the first port, according to a "round robin" type mechanism, thereby ensuring equitable sharing of the bandwidth.

Due to the polling, the latency time on the uplink is higher in a micro-switch than in a switch. The distribution between switches and micro-switches involves a compromise between latency and complexity of the network. Generally, a subscribing terminal will be connected to a local micro-switch, unless latency time constraints require a direct connection to a switch. The architecture of the AFDX network will advantageously be chosen so that one does not pass through more than one switch and one micro-switch in going from a module to a subscribing terminal.

In the illustrated example, the AFDX network comprises eight micro-switches $\mu SW_1, \ldots, \mu SW_8$, connected directly to the switches $SW_1, SW_2$.

The micro-switches $\mu SW_1, \mu SW_2$ are located in the central area of the apparatus not far from the landing gear and the wing root section. The micro-switches $\mu SW_3, \mu SW_4$ and $\mu SW_5, \mu SW_6$ are also situated close to the wing root section, on the left and right of the apparatus, respectively. Lastly, the micro-switches $\mu SW_7, \mu SW_8$ are located at the fuselage tail, close to the tail group of the apparatus.

The micro-switches $\mu SW_1, \mu SW_2$ in particular serve the airplane sensors 420 (accelerometers, rate gyros, inertial unit), but also a set of sensors 422 shared with other control systems, such as the secondary flight control system, the braking control system of the landing gear, and the hydraulic system. The micro-switches $\mu SW_3, \mu SW_4$ and $\mu SW_5, \mu SW_6$ serve, on the left and right parts of the aircraft, respectively, the ailerons (denoted $AIL_i^g$ and $AIL_i^d$) and the spoilers (denoted $S_i^g$ and $S_i^d$) as well as a set 423, 424, respectively, of sensors shared with other control systems, such as the secondary flight control system or the propulsion control system (left and right engines). Lastly, the micro-switches $\mu SW_7, \mu SW_8$ serve the rear control surfaces, i.e. the rudders ($RDR_1$, $RDR_2$), and the elevators, i.e. the left and right elevators ($EL_i^g$ and $EL_i^d$) as well as the trimmable horizontal surface ($THS_1$, $THS_2$). These micro-switches can also serve a set 425 of sensors shared with another control system.

Connected to the frame switches $SW_1, SW_2$ are, aside from the aforementioned micro-switches, the computers 411 and 412, as well as the piloting members 451 and 452, via data concentrators. More precisely, the switch SW receives, on two distinct ports via the concentrators $CR_1$ and $CR_2$, the information provided by the piloting members 451 and 452 of the pilot and copilot. The concentrators $CR_1$ and $CR_2$ multiplex the same information coming from 451 and 452 for cross-monitoring purposes. Similarly, the switch $SW_2$ receives, on two separate ports via the concentrators $CR_3$ and $CR_4$, the information from these same piloting members. If applicable, if the piloting members provide the information in analog form, these concentrators can convert it into digital form, then format said digital data in the form of AFDX messages.

A set 421 of sensors shared with another control system, for example the steering control system of the front wheels, can also be connected to the switches $SW_1, SW_2$.

The computer 411 comprises two computation modules, i.e. a command module 411A, called COM module, and a monitoring module 411B, called MON module. The MON and COM modules have identical structures and only differ in how they are programmed (different algorithms). A COM module can be reconfigured as a MON module and vice versa. The MON and COM modules are generic computers, in practice IMA (Integrated Modular Avionics) cards mounted in a rack of the avionics bay, housing the specific application software. In the present case, the modules 411A and 411B respectively house specific application software $\alpha_A, \beta_A, \gamma_A$ and $\alpha_B, \beta_B, \gamma_B$ with $\alpha_B \neq \alpha_A, \beta_B \neq \beta_A, \gamma_B \neq \gamma_A$.

The COM module sends the actuators command messages via the AFDX network (the actuators are equipped with terminals subscribing to the network) and receives information or confirmation messages from the latter.

The MON module also receives the information or confirmation messages from the actuators and verifies the coherence between the command messages sent by the COM module and the information or confirmation messages that are returned to the latter by the different actuators.

In nominal mode, the computer 411 operates as master and the computer 412 as slave. In the event the computer 411 fails, detected by an incoherence between the COM and MON modules, the computer 412 takes over.

The control surface actuators are generally equipped with a command module COM and a monitoring module MON, responsible for verifying whether the electrical orders sent to the actuator by the COM module are indeed coherent with the commands sent by the modules of the computers. The two COM and MON modules of a same terminal can be multiplexed to be connected to the same port of a micro-switch or to be connected to different ports of a same micro-switch or ports of different micro-switches, the first option making it possible, however, to reduce the network cabling. The control surface actuators can also be provided with sensors subscribing to the network (for simplification reasons, only one connected has, however, been shown between a control surface and a micro-switch).

FIGS. 5A to 5D show the different alternatives for arranging an actuator and an associated sensor.

Figure 5A:
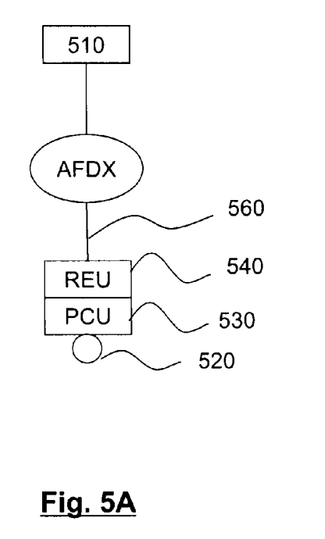
FIGS. 5A to 5D diagrammatically show different alternative arrangements of a sensor on an actuator.
Figure 5B:
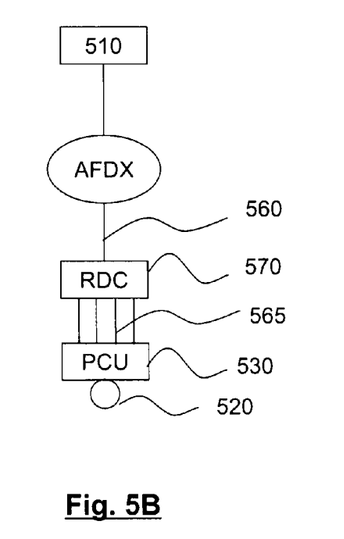

According to the first and second alternatives respectively illustrated in FIG. 5A and FIG. 5B, the sensor 520 is installed near, or directly mounted on the actuator. The actuator is operated by a hydraulic or electronic power control unit (PCU) 530.

In the first alternative illustrated in FIG. 5A, the computer 510 simply sends a position reference to a remote electronic unit (REU) 540, located near the actuator. This unit locally acquires measurements from the sensor, computes the controlling command and sends it to the actuator. It returns to the computer the current position of the actuator (or a measurement of the effect on the actuated system, for example the position of a control surface). The exchanges between the REU and the computer take place through the AFDX network, in other words the REU, subscribed to the network, receives from the computer the reference position, and returns the actual position of the actuator (or a measurement relative to the actuated system) in the form of AFDX messages on a same link 560.

In the second alternative, a data concentrator or RDC (Remote Data Concentrator) 570 forms the interface between the AFDX network, on the one hand, and the analog links 565 with the power control unit and the sensor, on the other hand. The computation of the controlling commands here is done by the computer 510 from the measurement returned by the sensor 520.

Figure 5C:
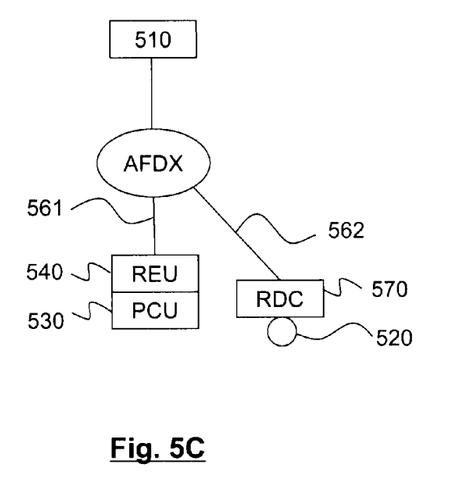
Figure 5D:
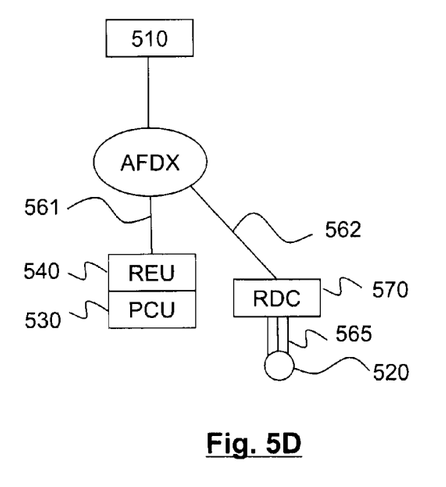

According to the third and fourth alternatives, respectively shown in FIGS. 5C and 5D, the position sensor is remote from the actuator. The remote control unit 540 and the sensor are then not connected to the AFDX network by a single and same link. The position reference is sent by the computer 510 to the power control unit 530 via a first link 561, and the actual position of the actuator and/or the measurement of the effect of the latter on the system is returned by the sensor 520 via a second connection 562, to the computer. In the fourth alternative, the sensor provides the position measurements in analog form and the data concentrator reformats it in the form of AFDX messages. In the third alternative, the sensor is capable of directly sending its measurements in the form of AFDX messages on the network ("smart sensor").

Figure 6:
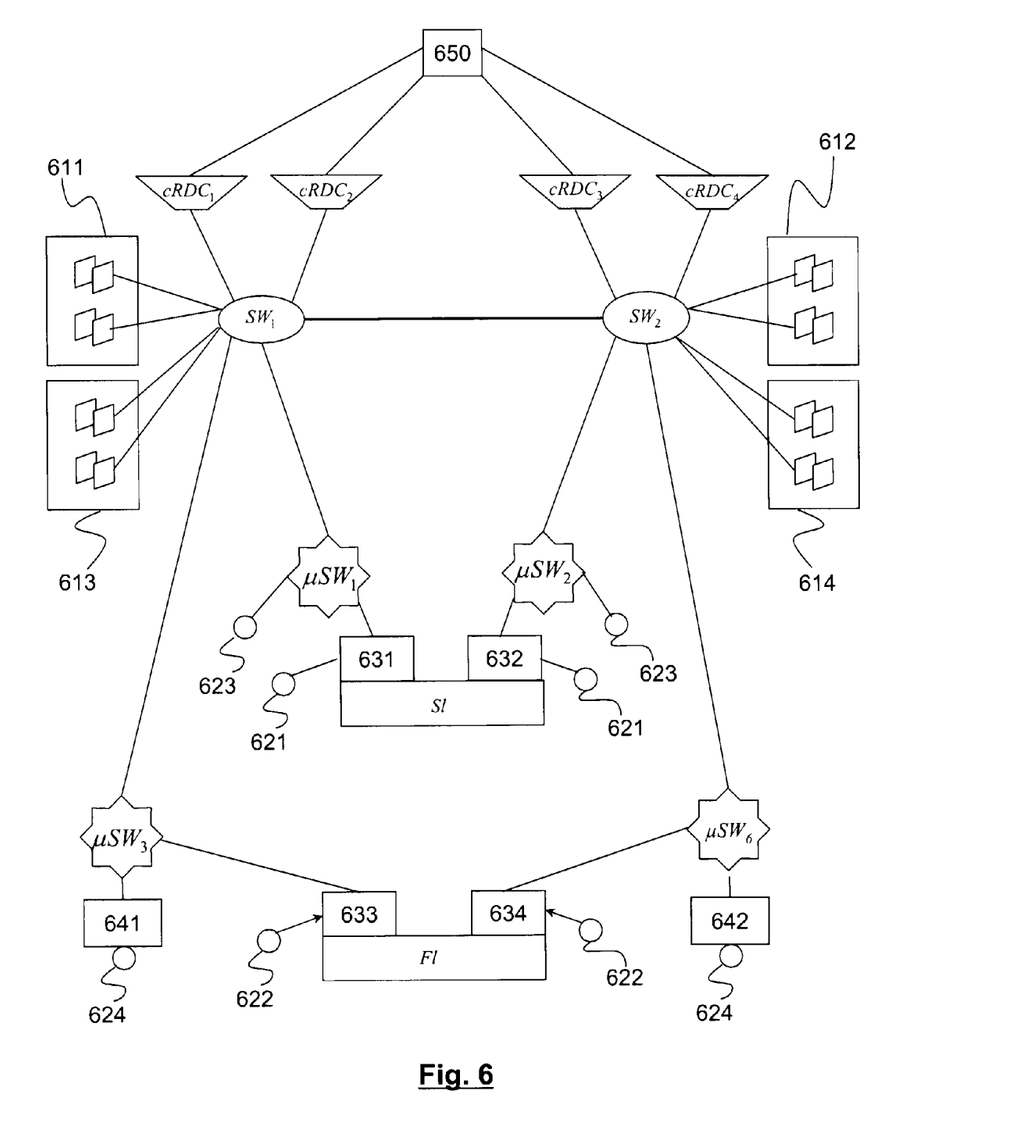
FIG. 6 diagrammatically shows an example of incorporating a secondary flight control system into the system of FIG. 3.

FIG. 6 shows an example of incorporation of a secondary flight control system into the system of FIG. 3.

In the illustrated example, the secondary flight control system controls the position of the flaps and leading edges of the aircraft. If necessary, it advantageously comprises smart wing tip brakes (SWTB), the function of which will be specified later.

The system includes a lever for selecting positions of the flaps and leading edges 650, shared by the pilot and copilot. This lever makes it possible to select the desired camber of the wings by acting first on the leading edges, then on the flaps.

The lever 650 is equipped with sensors (two on the pilot side and two on the copilot side) that transmit position information for the lever on the network, for example via data concentrators denoted $cRDC_1$ to $cRDC_4$. These concentrators perform the multiplexing of the analog signals received from the sensors (with analog signals from other sensors) as well as the conversion thereof into AFDX messages. Concentrators $cRDC_1$ and $cRDC_2$, on the one hand, and concentrators $cRDC_3$ and $cRDC_4$, on the other hand, make it possible to perform cross-monitoring of the position of the selection lever, using computers 611 and 612, respectively.

The position of the selection lever is sent to the computers 611 and 612 of the primary flight system (identical to the computers 411 and 412 of FIG. 5) as well as to the computers 613 and 614 of the secondary flight control system. The computers 613 and 614, like the computers 611 and 612, are of the generic type and each include a COM channel and a MON channel, each channel being made up of one or more specific logic modules. In nominal mode, the computer 613 acts as master and directly sends the commands to the actuators of the leading edges and the flaps. The computer 614 acts as slave in this operating mode, but takes over for the master computer if the latter fails.

The secondary flight control system comprises power control units (hydraulic or electric) 631, 632, jointly actuating a set Sl of drive shafts shared by both wings to deploy or retract the leading edges. These two control units are respectively connected to the micro-switches $\mu SW_1$ and $\mu SW_2$ of the network.

Similarly, the secondary flight control system comprises power control units 633 and 634, jointly actuating a set Fl of drive shafts shared by both wings to deploy or retract the high-lift flaps. These two control units are respectively connected to micro-switches $\mu SW_3$ and $\mu SW_6$.

The position sensors of the leading edge actuators 621 and those of the flap actuators 622 are also connected to the AFDX network. The different assembly alternatives of FIGS. 5A to 5D can be considered.

The position sensors of the leading edges 623 and those of the flaps 624 provide the respective output amplitudes for said elements. The measurements delivered by the sensors 624 are advantageously acquired by flight control remote modules (FCRM), belonging to the primary flight control system and distributed in the wings. These FCRM modules, designated by 641 and 642, then serve as data concentrators on behalf of the sensors 624. In this way, the available material resources of the primary flight control system are used by the secondary flight control system. The measurements delivered by the sensors 623 are sent to the network, for example via microswitches $\mu SW_1$ and $\mu SW_2$.

The secondary flight control system operates as follows:

The position of the selection lever 650 is acquired separately by concentrators $cRDC_1$ and $cRDC_2$ (and likewise by concentrators $cRDC_3$ and $cRDC_4$), installed close to the piloting members, and sent via the AFDX network to the computer 613 (respectively 614). The computer 613 determines an output reference for the leading edges and flaps according to the position of the lever and taking into account the different flight parameters such as altitude, airspeed, etc. The reference is sent via the AFDX network to the power control units, causing the shafts to deploy the leading edges and flaps to rotate. According to the considered alternative, the control at this reference value is done by the computer itself or, if the latency time through the network is too high, by remote control units at the actuators.

The sensors 621, 622 return the respective positions of the actuators to the computers, via the AFDX network.

Wing tip brakes (not shown) can be provided at a rate of two per deployment shaft, or two for the shafts of the flaps and two for the shafts of the leading edges. The brakes mounted on the deployment shafts of the leading edges are each connected to the two micro-switches $\mu SW_1$ and $\mu SW_2$. Similarly, the brakes mounted on the deployment shafts of the flaps are each connected to the two micro-switches $\mu SW_3$ and $\mu SW_6$. The wing tip brakes receive the positions of the actuators 623, 624 (angles of rotation of the shafts) and compare them to the measurements taken by their own sensors. In the event of inconsistency or if the deviation between these two measurements is too great, the rotation of the deployment shaft can be stopped to prevent asymmetrical lift and excessive mechanical stresses, or even breakage of said shaft.

Figure 7:
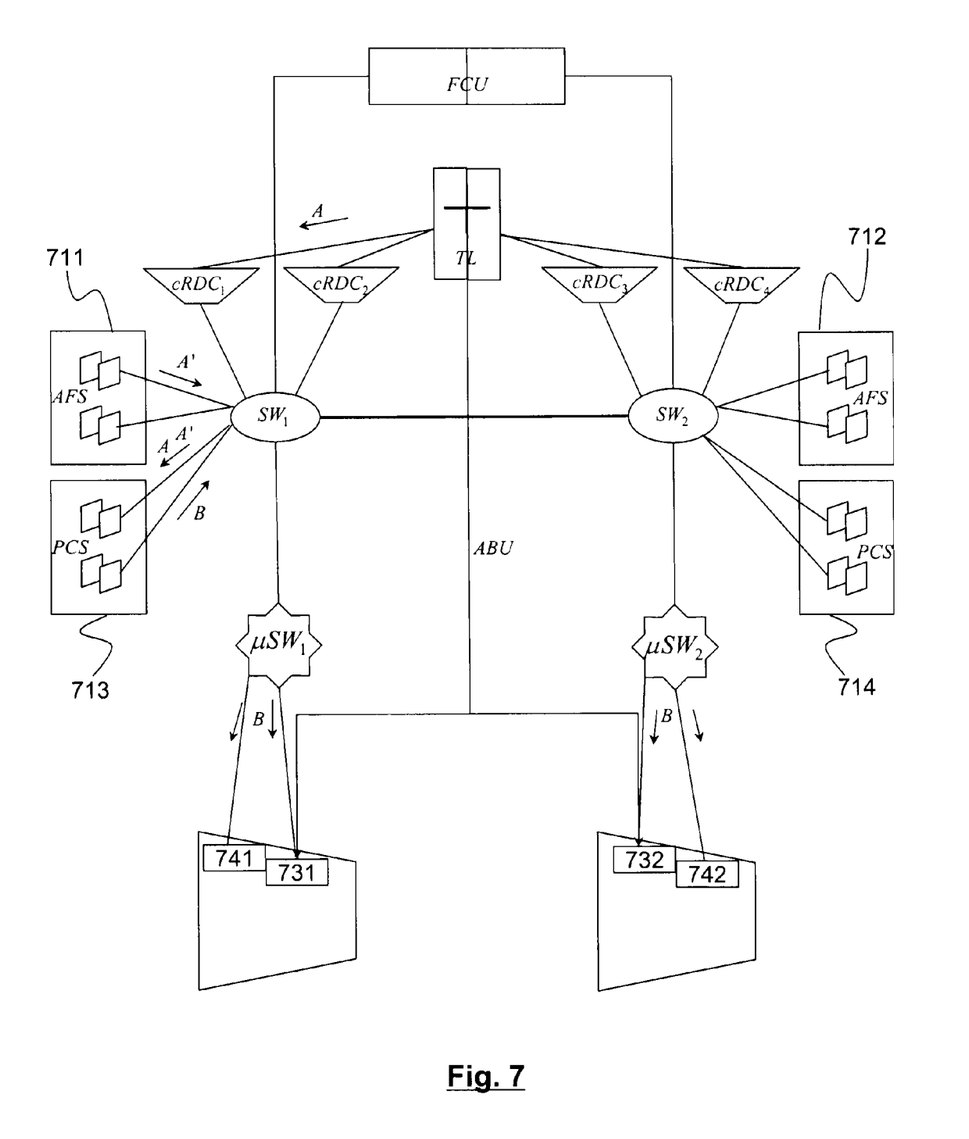
FIG. 7 diagrammatically shows an example of incorporating a propulsion control system into the system of FIG. 3.

FIG. 7 shows an example of incorporation of a propulsion control system into the system of FIG. 3.

This system comprises a manual thrust control member, for example thrust levers, at a rate of one per engine, denoted TL, situated in the cockpit.

The propulsion control system also comprises thrust computers and possibly thrust reversers. In the illustrated example, the system comprises the engine computers 731, 732, called EEC (Engine Electronic Controller), or FADEC (Full Authority Digital Engine Control), as well as the thrust reverser computers 741, 742. It should be noted that these computers locally ensure the control of the engines. In the case of a prop plane, the computers of the system in question control the pitches of the propellers. In general, the thrust reversal is done by electric or hydraulic means.

The position of the thrust control member is measured by sensors (not shown). The position measurements of these sensors are sent to the data concentrators $cRDC_1$ to $cRDC_4$, which relay them in the form of AFDX messages to the computers 711 and 712 of the primary flight control system (identical to the computers 411 and 412 of FIG. 4), more particularly to the AFS (Automatic Flight System) software module, as well as to the computers 713 and 714 of the propulsion control system.

The computers 713 and 714 are of the generic type and each include a COM channel and a MON channel, each channel being made up of at least one specific software module, PCS (Propulsion Control System). In nominal mode, according to the same principle as described above, the computer 713 is the master and the computer 714 is the slave, the latter taking over if the former fails.

In manual mode, the computer 713 determines the engine rating B, making it possible to obtain the required thrust, as a function of the thrust reference A provided by the manual thrust control member. The rating reference is sent, via the AFDX network, to the engine computers and the thrust reverser computers.

In automatic mode, the computer 711, and more precisely the automatic flight system software module, determines thrust references A', as a function of the position of the thrust levers and the altitude, heading and airspeed specified to the automatic flight system via the flight control unit (FCU), as well as certain outside parameters (temperature, pressure, flight phase, etc.). This thrust reference is sent, via the AFDX network, to the computer 713 (PCS software module), which deduces the engine rating references B therefrom. As in manual mode, the engine rating reference is sent, via the AFDX network, to the engine computers and the thrust reverser computers.

The engine computers 731, 732 ensure the operation of the engines at the reference rating and send back to the computers 713, 714, via the AFDX network, information providing the actual status of the engines.

The thrust reverser computers 741, 742 ensure the control of the reverser actuators and send back to the computers 713, 714, via the AFDX network, information providing the actual status of the reverser actuators.

If necessary, this information is processed by the computer 713 or 714 before being displayed in the control cabin.

Lastly, the propulsion control system advantageously comprises an emergency route or ABU (Analogue Back-Up), done by analogue lines directly connecting the thrust levers to the engine computers.

Figure 8:
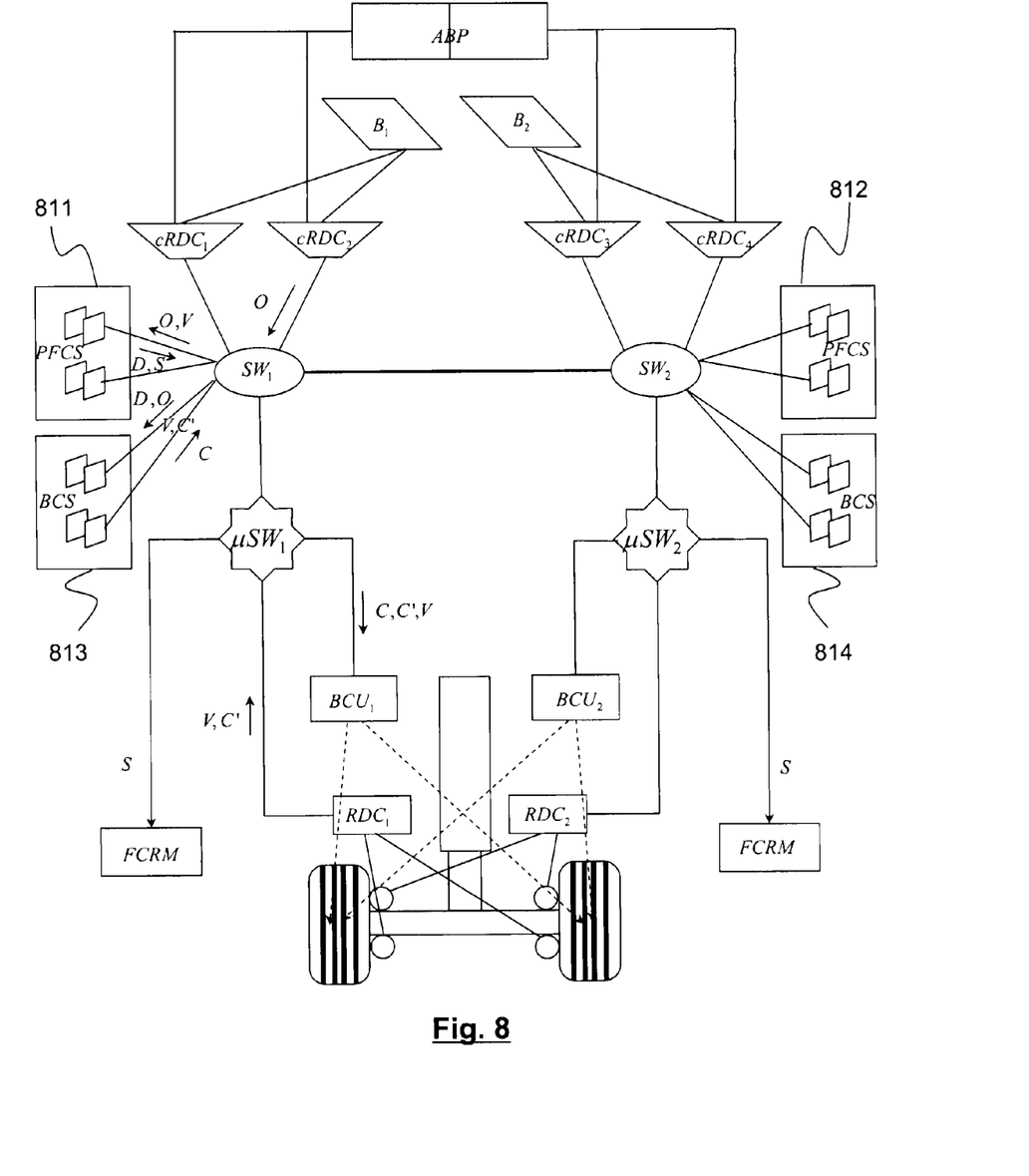
FIG. 8 diagrammatically shows an example of incorporating a braking control system into the system of FIG. 3.

FIG. 8 shows an example of incorporation of a braking control system into the control system of FIG. 3.

This system comprises brake pedals $B_1$, $B_2$ for the pilot and copilot, the automatic brake panel ABP and braking control units $BCU_1$, $BCU_2$, located at the landing gear and acting on the brake cylinders. It should be noted that the braking control units locally ensure braking torque control and anti-locking of the wheels.

The positions of the brake pedals or the automatic braking references (for example gentle, average or hard braking) are acquired by the data concentrators $cRDC_1$ to $cRDC_4$ and sent in the form of AFDX messages to the computers 811 and 812 of the primary flight control system (identical to the computers 411 and 412 of FIG. 4), more precisely to the applications responsible for automatic braking PFCS (Primary Flight Control System), as well as to the computers 813 and 814 of the braking control system, more specifically to the specific BCS (Brake Control System) software module.

In automatic mode, the computer 811 determines, from the reference O selected by the pilot on the automatic brake panel and other outside parameters, the deceleration D to be applied. In manual mode (not shown), the computer 813 determines the deceleration D from positions of the brake pedals. It then determines, in manual or automatic mode, the reference braking torque C to be applied to the wheels and sends it to the braking control units $BCU_1$, $BCU_2$ in the form of AFDX messages.

The computers 813 and 814 are of the generic type and each include a COM channel and a MON channel, each channel being made up of at least one specific software module, BCS. In nominal mode, according to the same principle as described above, the computer 813 is the master and the computer 814 is the slave, the latter taking over if the former fails.

The wheels of the landing gear are equipped with braking torque and speed sensors for the wheels. The actual braking torque C' as well as the speed V thus measured are sent to the computers via data concentrators RDC that format the measurements in the form of AFDX messages. More specifically, the speed V is sent to the computer 811 (and 812) as well as the computer 813 (and 814), while the braking torque C' is sent only to the computer 813 (and 814). The braking torque C' and the speed V can also be sent to the control units $BCU_1$, $BCU_2$ to respectively ensure the local braking torque control and perform the anti-locking function of the wheels.

The computer 811 determines, from the speed V and, if necessary, other parameters, whether it should allow the spoilers to come out. If yes, the exit order S for the spoilers is sent, via the AFDX network, to the electronic control modules of the spoilers FCRM, i.e. those of the actuators of the control surfaces $S_i^g$ and $S_i^d$ of FIG. 4.

In as much as one can guarantee a short enough latency time in the network, it is possible to consider performing the braking torque control not locally by the braking control units $BCU_1$, $BCU_2$, but directly by the specific software module BCS.

Figure 9:
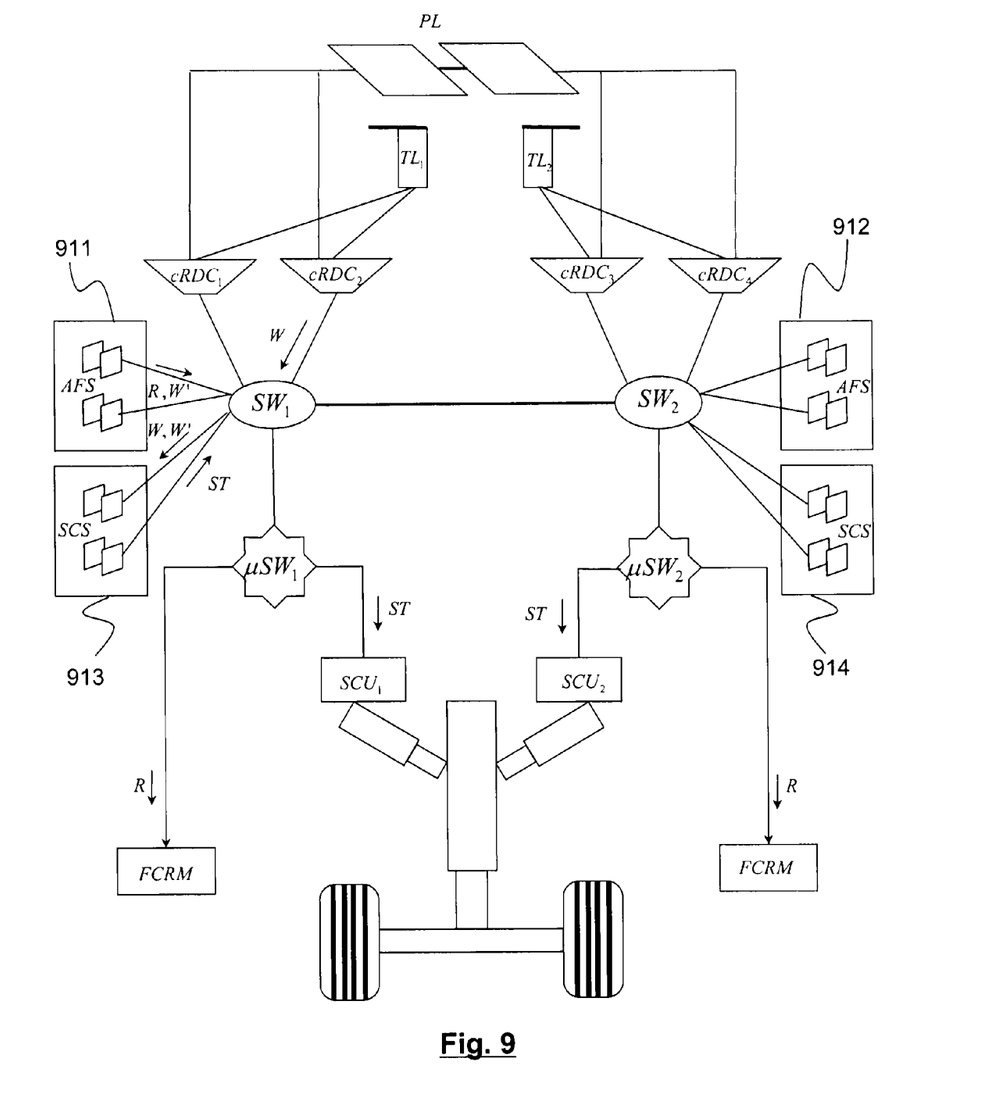
FIG. 9 diagrammatically shows an example of incorporating a steering control system into the system of FIG. 3.

FIG. 9 shows an example of incorporation of a steering control system into the control system of FIG. 3.

This system comprises a rudder bar (shared by the two pilots) PL, and tillers $TL_1$, $TL_2$, situated in the control cabin, as well as steering control units $SCU_1$ $SCU_2$ situated on the nose wheel and, depending on the type of aircraft, on the main landing gear. These units $SCU_1$ $SCU_2$ control actuators and ensure their control around a given reference position.

The positions, denoted W, of the rudder bar and/or tillers are acquired, as before, using data concentrators $cRDC_1$ to $cRDC_4$ and sent in the form of AFDX messages to the computers 911 and 912 of the primary flight control system (identical to computers 411 and 412 of FIG. 4), more particularly to the AFS (Automatic Flight System) software module, as well as to computers 913 and 914 of the steering control system.

The computers 913 and 914 are of the generic type and each include a COM channel and a MON channel, each channel being made up of at least one specific software module, SCS (Steering Control System). In nominal mode, the computer 913 is the master and the computer 914 is the slave, the latter taking over if the former fails.

In manual mode, the computer 913 (or 914) determines, from positions W, the deflection order reference ST of the wheels and sends it to the control units $SCU_1$, $SCU_2$, via the AFDX network. These units return to the computers the actual orientation angle of the wheel(s). In parallel, the computer 911 (or 912) can determine, from positions W, and as a function of the airspeed of the airplane, the deflection order reference R of the vertical stabilizer. This reference is then sent, via the AFDX network, to the electronic control modules of the rudder FCRM, of the primary flight system, i.e. to those of the actuators RDA and $RDR_2$ of FIG. 4. The FCRM modules in question return the actual orientation angle of the vertical stabilizer to the computers 911 and 912.

In automatic landing mode, the AFS module of the computer 911 (or 912) determines, from a certain number of parameters, in particular the angular deviation between the axis of the airplane and the axis of the runway, the speed of the airplane, an angular reference W' that is sent, via the AFDX network, to the computer 913 (or 914). The computer 913 (or 914) determines, from W', the deflection order reference ST of the wheels and sends it, as before, to the control units $SCU_1$, $SCU_2$, via the AFDX network. Moreover, the AFS module can also send a vertical stabilizer angle reference R to the FCRM electronic control modules, as before. The references ST and R are calculated so that at a low speed, the action exerted on the wheels is preponderant relative to that on the rudder. Conversely, at high speed, the action exerted on the rudder is preponderant relative to that exerted on the wheels.

Figure 10A:
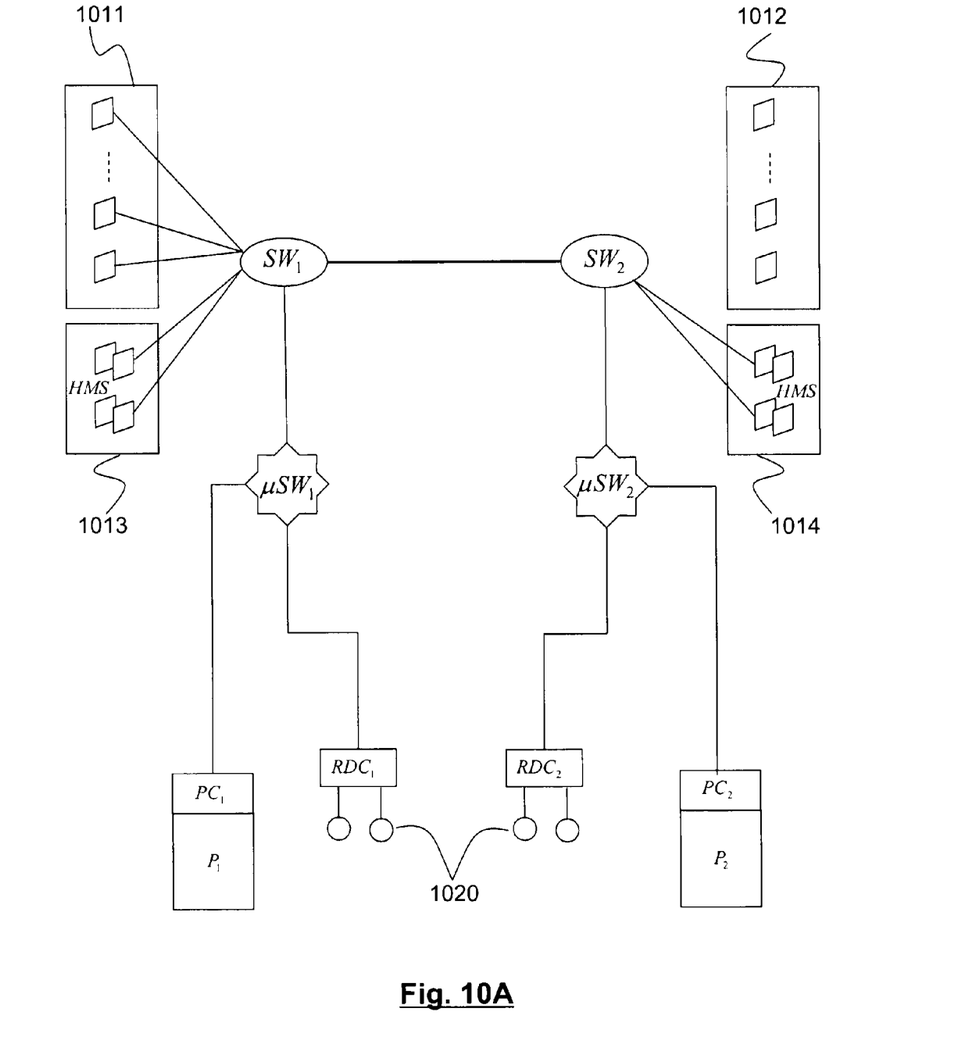
FIGS. 10A and 10B diagrammatically show an example of incorporating first and second alternatives of a hydraulic control system into the system of FIG. 3.

FIG. 10A shows an example of incorporation of a first alternative of a hydraulic system in the control system of FIG. 3.

This system comprises a plurality of segregated hydraulic circuits, each being equipped with pumps and pressure sensors, as well as generic computers 1013, 1014. Each of these computers has a COM channel and a MON channel, each channel being made up of one or more specific software modules, HMS (Hydraulic Management System). The computers 1013 and 1014 each control a respective hydraulic circuit.

FIG. 10 also shows the other computers/software modules 1011, 1012 that can use the pressure measurements provided by the sensors of the hydraulic system.

The electric pumps $P_1$, $P_2$ are respectively associated with power contactors $P_1$, $P_2$, which make it possible to turn them on or off. These power connectors can for example be semiconductor contactors (Solid State Power Controller), or electromechanical contactors. These contactors are steered by the HMS software module.

In the illustrated alternative, the pressure sensors 1020 are remote from the contactors of the electric pumps $P_1,P_2$ within the configuration illustrated in FIG. 5D. In other words, the measurements of the sensors are acquired, formatted in the form of AFDX messages, then sent to the computers 1013, 1014 by the data concentrators $RDC_1$, $RDC_2$.

Figure 10B:
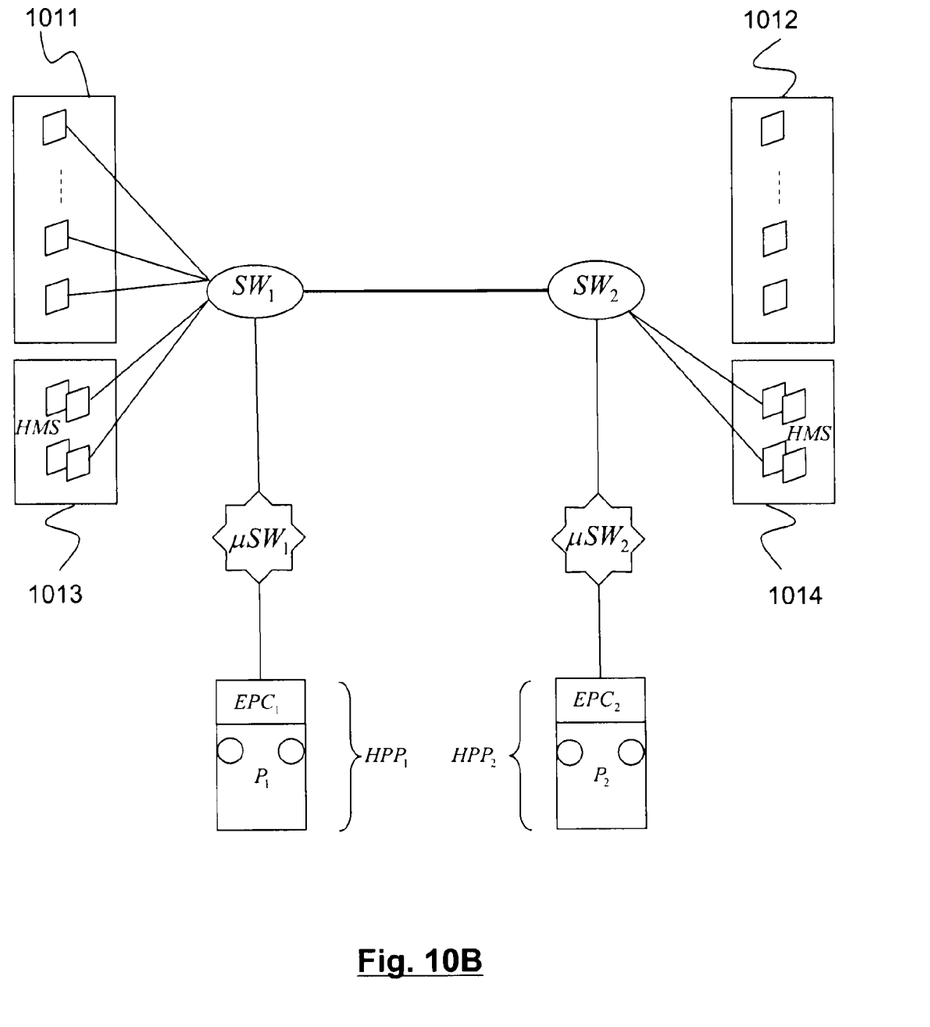

A second alternative of the hydraulic control system is shown in FIG. 10B. This alternative differs from the first in that it comprises hydraulic power packages $HPP_1$, $HPP_2$. This alternative corresponds to the sensor configuration of FIG. 5A. Each integrated package comprises an electric pump, pressure sensors and electronic power control units $EPC_1$, $EPC_2$. These electronic units are each able to receive, via the AFDX network, orders to power on and off, engine speed references (or equivalently flow rate references) of the pump, and to send the pressure information provided by the sensors to the HMS software modules of the computers 1013, 1014, as well as to the other software modules of the computers 1011, 1012.

It will be understood that other alternatives of the hydraulic control system may alternatively be considered, for example by using the sensor configurations illustrated in FIGS. 5B and 5D, without going beyond the scope of the present invention.

Reference has been made in the description to generic computers 411-412, 611-614, 711-714, 811-814, 911-914, 1011-1014. One skilled in the art will understand that these computers can be made using one or more IMA boards. The computers belonging to distinct control systems can be virtual machines and therefore share all or part of a plurality of IMA cards.

Likewise, the software modules housed by the aforementioned computers can reside on one or more IMA boards and, vice versa, an IMA board can house software modules relative to different control systems.

The present description has successively shown the integration and cooperation of the primary flight control system with the secondary flight control system, the propulsion control system, the braking control system, the steering control system and the hydraulic control system. It will be understood that all or some of these control systems could be incorporated together with the primary flight system. In the event they are integrated with the latter, one skilled in the art will understand that the complete system makes it possible to offer flight control, braking, etc. laws that are very efficient inasmuch as said laws involve several control systems working in synergy.

The invention claimed is:

1. An aircraft control system of an aircraft comprising:
a first control system configured to control a first function of the aircraft; and
a second control system, different from the first control system, configured to control a second function of the aircraft different from the first function,
wherein
the first control system includes at least one first computer and a first set of first sensors and first actuators, the first computer being configured to receive measurements from the first sensors and to control the first actuators of the first set,
the second control system includes at least one second computer and a second set of second sensors and second actuators, the second computer being configured to receive measurements from the second sensors and to control the second actuators of the second set,
the first and second computers, the first and second sensors, and the first and second actuators of the first and second sets subscribe to a same Avionics Full Duplex Switched Ethernet (AFDX) network, and
the first and second sets have at least one shared sensor.

2. The aircraft control system according to claim 1, wherein the first and second computers each include a control channel and a monitoring channel, each channel being associated with software specific to a function performed by a corresponding one of the first computer and the second computer, housed by a generic computer, the specific software of the first channel being different from the specific software of the second channel.

3. The aircraft control system according to claim 1, wherein the first control system is a primary flight control system configured to control ailerons, elevators, vertical stabilizers, and spoilers of the aircraft.

4. The aircraft control system according to claim 3, wherein the second control system is a secondary flight control system configured to control slats and flaps of the aircraft.

5. The aircraft control system according to claim 4, wherein the secondary flight control system includes the second sensors, and the second sensors measure respective output amplitudes of the flaps, measurements provided by the second sensors being sent to the AFDX network using electronic control modules of the primary flight control system, and the electronic control modules being configured to control actuators of aircraft spoilers of the aircraft.

6. The aircraft control system according to claim 3, wherein the second control system is a propulsion control system, configured to control respective speeds of aircraft engines.

7. The aircraft control system according to claim 6, wherein the second computer is configured to receive, in a manual mode, a thrust reference from a manual thrust control member or, in an automatic mode, from the first computer, and to deduce therefrom an engine speed reference before sending the engine speed reference to a control unit of one of said aircraft engines of the aircraft.

8. The aircraft control system according to claim 4, wherein the second control system is a braking control system of the aircraft.

9. The aircraft control system according to claim 8, wherein the braking system includes the second sensors, the second sensors being speed sensors and torque sensors mounted on a landing gear of the aircraft, respective speed and torque measurements provided by the second sensors being acquired and formatted in a form of AFDX messages by data concentrators before being transmitted to the second computer via the AFDX network.

10. The aircraft control system according to claim 9, wherein the speed measurements are sent to the first computer by the data concentrators, via the AFDX network, the first computer determining an output order for spoilers as a function of the measured speed and braking information, in a manual mode by brake pedals, and in an automatic mode by an automatic braking unit.

11. The aircraft control system according to claim 4, wherein the second control system is a steering system for at least a front wheel of the aircraft.

12. The aircraft control system according to claim 11, wherein the first and second computers receive deflection information provided by at least one of a rudder bar and control rods of a piloting station and, in a manual mode, the second computer determines a deflection angle of the front wheel and sends the determined deflection angle, via the AFDX network, to a steering control unit, and, in an automatic piloting mode, the first computer determines a command of the rudder bar, sends the command of the rudder bar, via the AFDX network, to the second computer, and the second computer deduces the deflection angle therefrom and transmits the deduced deflection angle to the steering control unit.

13. The aircraft control system according to claim 4, wherein the second control system is a hydraulic control system of the aircraft, configured to start and stop at least one electric pump mounted on a hydraulic circuit.

14. The aircraft control system according to claim 13, wherein the hydraulic control system includes at least one contactor subscribing to the AFDX network and is configured to start/stop the at least one electric pump, and a pressure sensor is mounted on the hydraulic circuit, pressure measurements provided by the pressure sensor being acquired and formatted in a form of AFDX messages by a data concentrator, and then sent to the first and second computers via the AFDX network.

15. An aircraft comprising an aircraft control system according to claim 1.

16. The aircraft control system according to claim 1, wherein each said sensor of the first and second sets is an actuator sensor configured to sense a characteristic of a corresponding actuator and to output signals regarding the sensed characteristic to a corresponding one of the first and second computers via the AFDX network.

17. The aircraft control system according to claim 1, wherein the AFDX network includes:
- a pair of frame switches; and
- a plurality of micro-switches, each said micro-switch being coupled in the AFDX network to only one of said frame switches and at least one of one or more of the actuators and one or more of the sensors of the first or second set.

18. The aircraft control system according to claim 1, further comprising:
- a pair of frame switches; and
- a plurality of micro-switches,
- wherein an architecture of the AFDX network is such that a command from one of the first computer and the second computer does not pass through more than one of said frame switches and more than one of said micro-switches to reach a subscribing terminal coupled to the one micro-switch.

* * * * *